F. ADEE & J. FOLEY.
Traps and Bends.
No. 168,121. Patented Sept. 28, 1875.
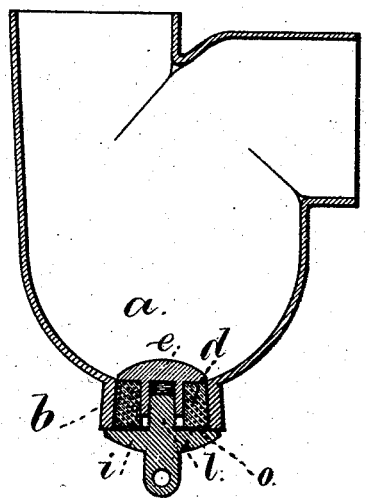
Fig. 1.
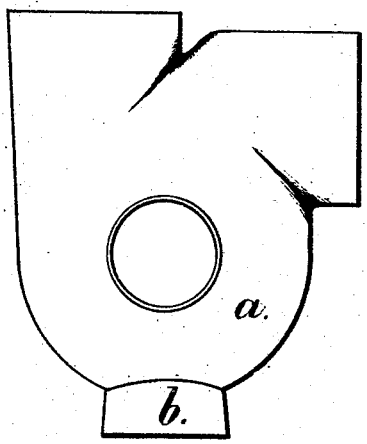
Fig. 2.
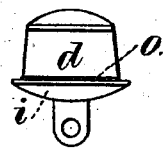
Witnesses
Chas. H. Smith
Harold Serrell
Inventors
Frederick Adee
James Foley
per Lemuel W. Serrell
atty.

UNITED STATES PATENT OFFICE.

FREDERICK ADEE AND JAMES FOLEY, OF BROOKLYN, NEW YORK.

IMPROVEMENT IN TRAPS AND BENDS.

Specification forming part of Letters Patent No. 168,121, dated September 28, 1875; application filed September 2, 1875.

*To all whom it may concern:*

Be it known that we, FREDERICK ADEE and JAMES FOLEY, of Brooklyn, in the county of Kings and State of New York, have invented an Improvement in Traps and Bends, of which the following is a specification:

In the construction of lead traps and bends there has been an opening for giving access to clean the trap, and in this opening there has been a screw-plug. The rim into which the plug screws has sometimes been of brass soldered to the lead trap, and in other instances the brass ring has been within a lead ferrule upon the trap or bend, or else the screw-thread has been formed in the lead ferrule itself. In the latter instance the lead screw-thread is liable to be injured by the brass screw-plug. In the other cases the brass rim is expensive, and difficult to fit in place; and the screw-thread, in all instances, is liable to become dirty, and there is difficulty in removing and applying such screw-plugs.

Our invention consists in a plain cylindrical thimble upon the trap or bend, in combination with an expansible stopper of india-rubber, provided with a screw-follower, by means of which we are enabled to cast the lead trap with a simple tube-section forming the opening for cleaning the trap, and dispense with screw-threads upon the trap itself; hence there are not any screw-threads to become filled with dirt in cleaning out the trap. The plug can be drawn out after being loosened, or inserted instantly, according to the condition of the contents of the trap or bend, and there is no risk of the parts becoming inoperative by wear; besides which the elastic washers, indispensable with the present trap-screws, are not used, and risk of leakage and difficulty in fitting such washers are avoided.

In the drawing, Figure 1 is a section of the trap and stopper complete, and Fig. 2 is an elevation of the trap with the stopper removed.

The trap shown is similar to that in our patent of April 20, 1875, No. 162,331, but it may illustrate any trap or bend.

*a* is the bottom of the trap or bend, or other portion thereof, at which the opening is to be made, and *b* is the cylindrical ferrule or thimble that by preference is cast or formed with the trap. This cylindrical thimble is smooth and plain inside. It may be slightly tapering or slightly contracted around the outer end, but we prefer to have the same parallel in the inner surfaces of the ferrule. The expansive stopper is made of the cylindrical rubber plug *d*, follower *e*, with its tubular extension forming a nut within the plug *d*, and a flanged head, *i*, having a screw, *l*, that enters the follower. There is a metal washer, *o*, between the rubber plug *d* and the flanged head *i*, in order that the head *i* and screw *l* may be revolved freely in tightening up the follower and expanding the rubber, and this washer *o* also prevents the rubber adhering to the inside of the head *i* by the pressure and lapse of time.

We claim as our invention—

The trap or bend made with the plain cylindrical thimble *b*, in combination with the rubber plug *d*, follower *e*, screw *l*, and head *i*, substantially as set forth.

Signed by us this 30th day of August, 1875.

FREDERICK ADEE.
JAMES FOLEY.

Witnesses:
GEO. E. PINCKNEY,
GEO. D. WALKER.